United States Patent [19]

Brown

[11] Patent Number: 4,790,561

[45] Date of Patent: Dec. 13, 1988

[54] SEAT BELT SYSTEM

[75] Inventor: Louis R. Brown, Livonia, Mich.

[73] Assignee: TRW Vehicle Safety Systems Inc., Lyndhurst, Ohio

[21] Appl. No.: 136,561

[22] Filed: Dec. 22, 1987

[51] Int. Cl.⁴ .............................................. B60R 22/46
[52] U.S. Cl. .................................... 280/806; 180/268
[58] Field of Search ................ 280/806, 801; 180/268, 180/269; 242/107, 107.4 R, 107.4 E

[56] References Cited

U.S. PATENT DOCUMENTS

| 3,838,746 | 10/1974 | Andres | 280/806 |
| 4,423,846 | 1/1984 | Fohl | 280/806 |
| 4,597,545 | 7/1986 | Burghardt | 280/806 |

FOREIGN PATENT DOCUMENTS

| 171580 | 2/1986 | European Pat. Off. | 280/801 |
| 2828297 | 1/1980 | Fed. Rep. of Germany | 280/806 |
| 3430871 | 5/1986 | Fed. Rep. of Germany | . |
| 3536393 | 4/1987 | Fed. Rep. of Germany | 280/806 |

OTHER PUBLICATIONS

Popular Science, "Safety System", Mar. 1987, p. 12.

*Primary Examiner*—Ross Weaver
*Attorney, Agent, or Firm*—Tarolli, Sundheim & Covell

[57] ABSTRACT

An apparatus for use in a vehicle having a member driven by a motive power source of the vehicle. The apparatus includes a seat belt retractor having a spool supported for rotation in belt retraction and belt withdrawal directions. The spool is connected with the driven member to rotate the spool in the belt retraction direction in response to the vehicle decelerating at a rate above a predetermined rate.

13 Claims, 4 Drawing Sheets

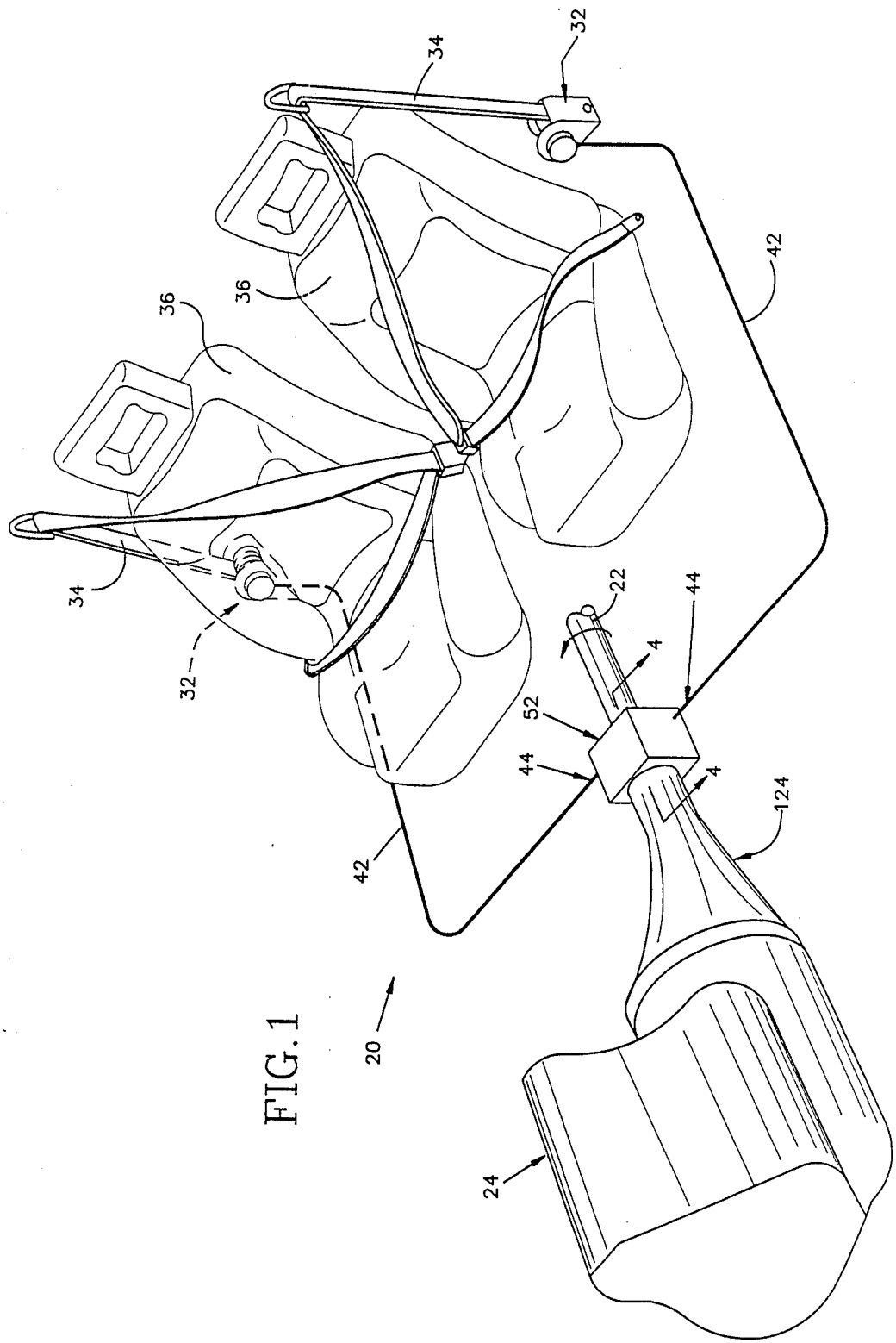

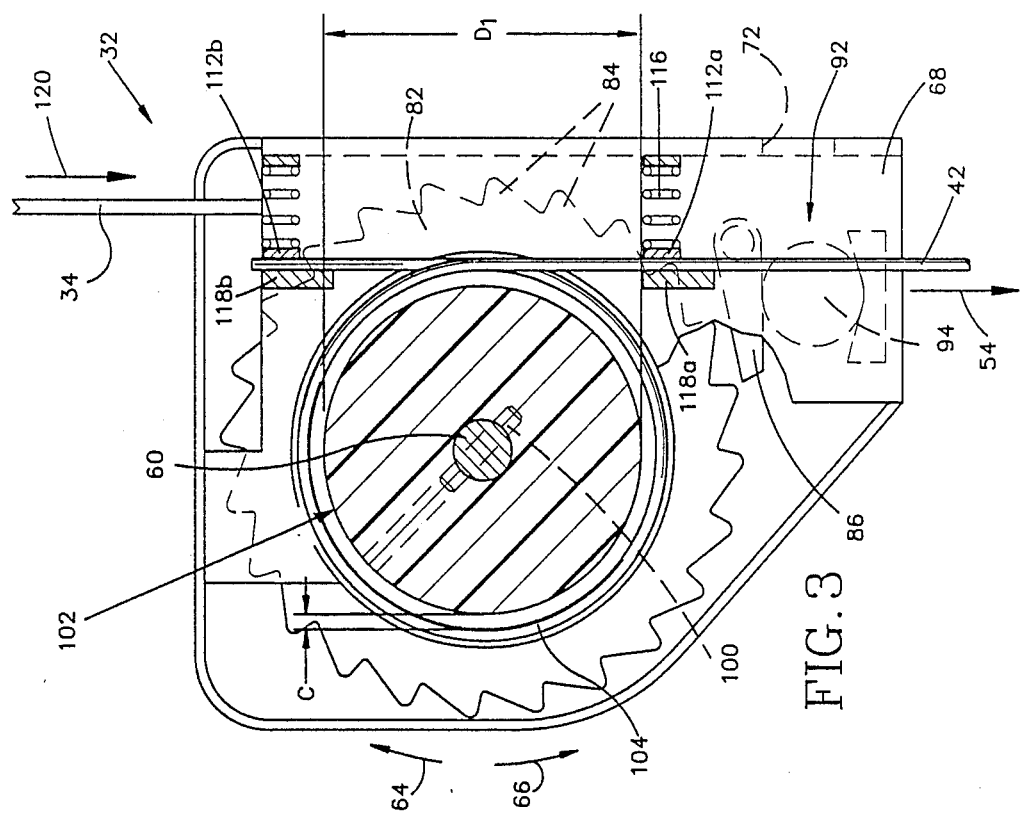
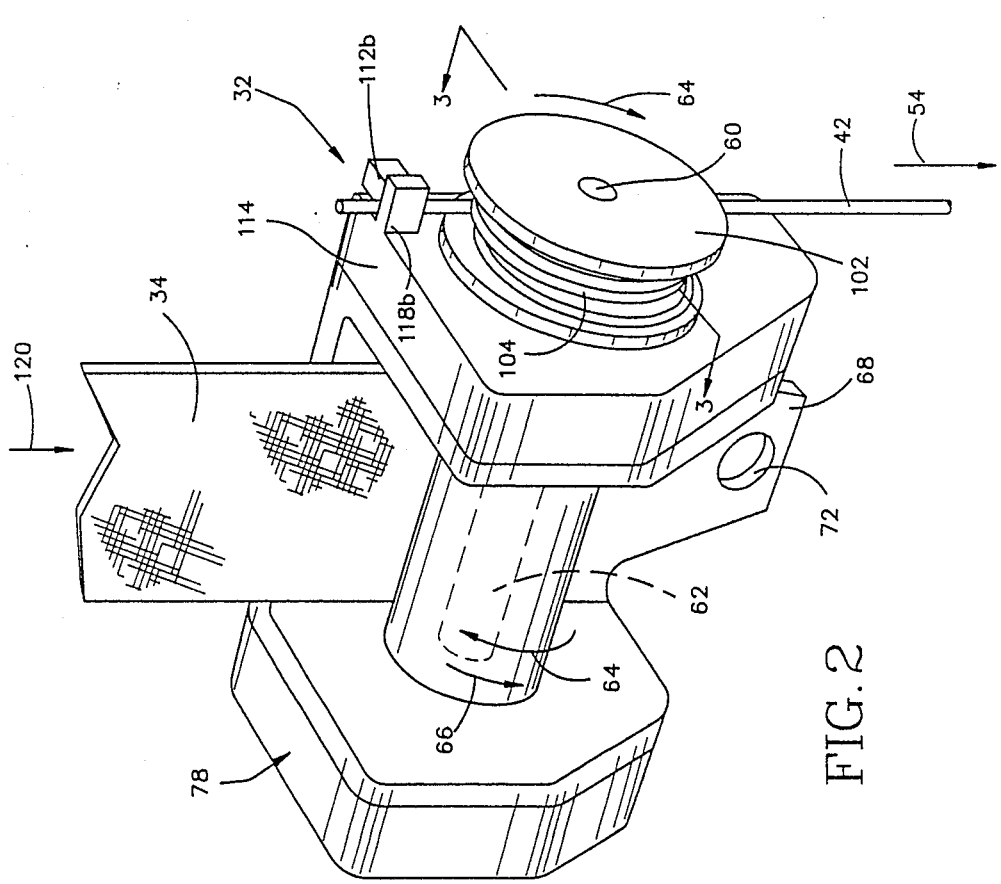
FIG. 3
FIG. 2

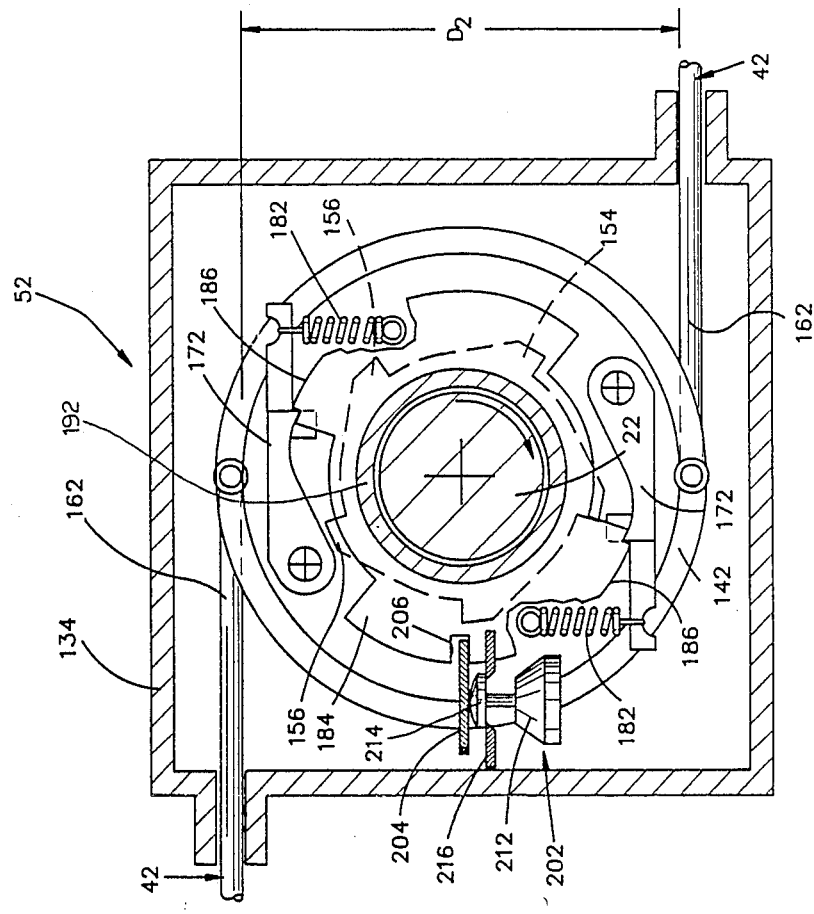
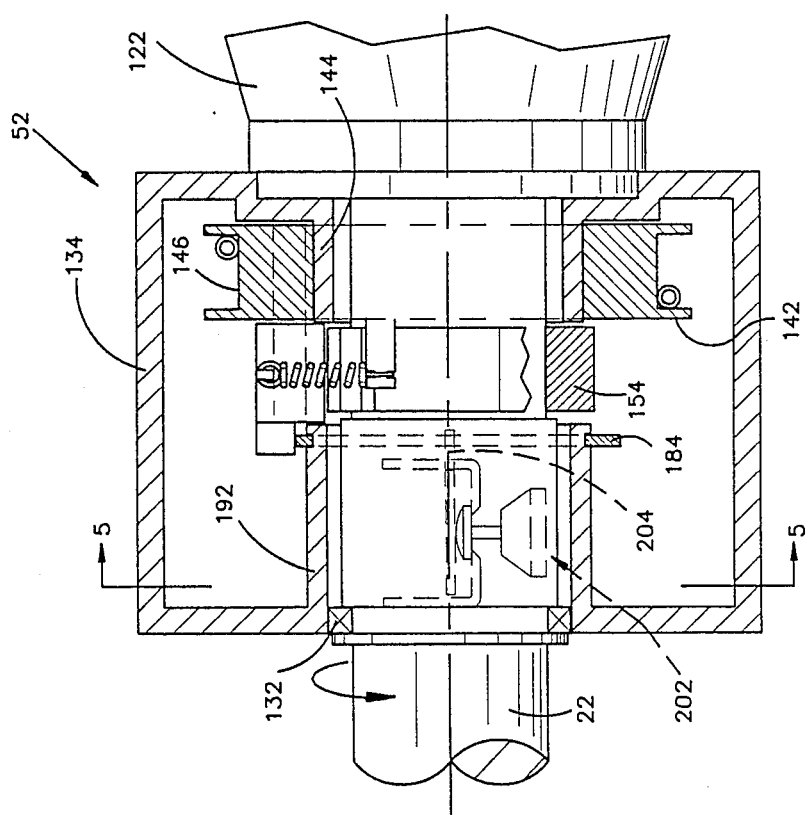
FIG. 5
FIG. 4

SEAT BELT SYSTEM

BACKGROUND OF THE INVENTION

1. Field of the Invention

The present invention relates to a seat belt system for restraining an occupant of a vehicle. In particular, the present invention relates to the tensioning of seat belt webbing about the occupant during an emergency situation, such as a collision.

2. Description of the Prior Art

An automotive vehicle is typically equipped with a seat belt that restrains movement of the occupant during an emergency situation, such as a collision. To restrain movement of the occupant effectively, the seat belt webbing should be tight against the occupant. Systems which pull the seat belt tight against the occupant during an emergency situation are known.

An example of such a system is shown in U.S. Pat. No. 4,423,846. U.S. Pat. No. 4,423,846 discloses a seat belt retractor having a spool on which seat belt webbing is wound. The spool is supported for rotation in belt withdrawal and belt retraction directions. A drum is connectable with and rotatable with the spool. An end portion of a cable is connected to the drum and is wound onto the drum. The other end portion of the cable is connected to a relatively large mass, such as the vehicle's engine, which is movable relative to the vehicle under certain circumstances. For example, during a head-on collision, the engine will break loose from the vehicle frame, upon deceleration of the vehicle at a rate above a predetermined rate, and move forward relative to the vehicle frame. The movement of the engine causes the cable to rotate the drum, thereby rotating the retractor spool in the belt retraction direction to tighten the seat belt webbing against the occupant.

In an alternate embodiment disclosed in U.S. Pat. No. 4,423,846, the other end portion of the cable is connected to a piston in a chamber of a pyrotechnic device, rather than to the engine. Upon sensing the occurrence of an emergency situation, such as a collision, gas generating material is ignited and the piston moves within the chamber due to the expanding gases. This pulls the cable to rotate the drum, thereby rotating the retractor spool in the belt retraction direction to tighten the seat belt webbing against the occupant.

U.S. Pat. No. 4,597,545 discloses another seat belt tensioning system. In U.S. Pat. No. 4,597,545, a retractor is slidably connected to the vehicle. One end of a cable is connected to the retractor. The cable is trained about pulleys and its other end is connected to the front bumper of the vehicle. The front bumper moves inwardly relative to the vehicle during a head-on collision. This inward movement of the front bumper tensions the cable, which in turn slides the retractor relative to the vehicle to tension the belt webbing against an occupant.

SUMMARY OF THE INVENTION

In accordance with the present invention, a seat belt is tightened against an occupant by rotating the retractor spool in a belt retraction direction. The apparatus for rotating the spool in the belt retraction direction includes an elongate flexible member, such as a cable. The elongate flexible member has one end associated with a first drum connected with the spool of the retractor. The elongate flexible member is wound around the first drum. The other end of the elongate flexible member is connected to a second drum. The second drum is a part of a clutch mechanism. When the clutch mechanism is actuated, the second drum is rotated by an engine driven member.

When the second drum rotates, the elongate flexible member winds up on the drum. The end of the elongate flexible member associated with the first drum rotates the first drum to rotate the spool in the belt retraction direction to tighten the seat belt webbing against the occupant. This forces the occupant against the seat back. The clutch mechanism is actuated in response to the vehicle decelerating at a rate above a predetermined rate.

In a preferred embodiment of the present invention, the clutch mechanism includes a ratchet wheel having a plurality of teeth connected to and rotatable with an engine driven member. A clutch dog is carried by the second drum for pivotal movement relative to the drum. The clutch dog pivots to a position for engaging a tooth on the ratchet wheel to connect the second drum with the driven member so that the second drum and driven member rotate together. The clutch dog pivots in response to the vehicle decelerating at a rate above the predetermined rate.

The apparatus of the present invention also includes means for releasing the driving connection between the spool and the driven member in response to a predetermined force resisting rotation of the spool in the belt retraction direction. This insures that the belt will not be drawn too tightly against the occupant.

BRIEF DESCRIPTION OF THE DRAWINGS

Further features of the present invention will become apparent to those skilled in the a t to which the present invention relates from reading the following specification with reference to the accompanying drawings, in which:

FIG. 1 is a schematic view of a seat belt system, according to the present invention;

FIG. 2 is a perspective view of a seat belt retractor used in the seat belt system of FIG. 1;

FIG. 3 is a cross sectional view of the seat belt retractor of FIG. 2, taken approximately along line 3—3 of FIG. 2;

FIG. 4 is cross sectional view of a clutch mechanism used in the seat belt system of FIG. 1, taken approximately along line 4—4 of FIG. 1;

FIG. 5 is a cross sectional view of the clutch mechanism of FIG. 4, taken approximately along line 5—5 of FIG. 4.

DESCRIPTION OF A PREFERRED EMBODIMENT

Figure 7:
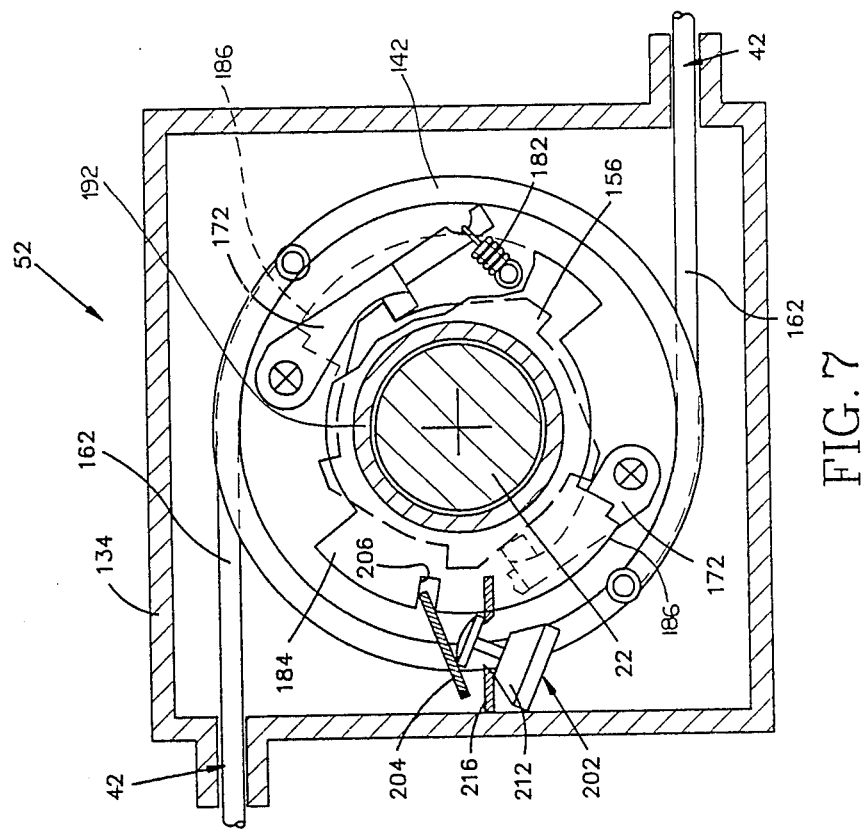
FIGS. 6 and 7 are cross sectional views similar to FIG. 5 illustrating parts in different positions.

The seat belt system 20 (FIG. 1), embodying the present invention, is used in a vehicle having a rotatable drive line member 22 which is driven by a motive power source of the vehicle, such as an internal combustion engine 24. The seat belt system 20 includes a pair of seat belt retractors 32. Seat belt webbing 34 extends from each of the seat belt retractors 32. The seat belt webbing 34 is to be trained around an occupant of the seat 36 associated with the respective retractor 32, as is known. The seat belt system 20 takes up slack in the seat belt webbing 34 and tightens it against the occupant to force the occupant against the back of the seat 36 during an emergency situation, such as a collision.

The vehicle has parts which continue to rotate for a period of time after a collision. This occurs because the rotating mass of the parts of the vehicle cannot be instantaneously stopped during the collision. For example, in a rear wheel drive vehicle, parts of the engine and transmission as well as the drive shaft continue to rotate for a period of time after a head-on collision. In a front wheel drive vehicle, parts of the engine continue to rotate for a period of time after a collision. The time during which parts of the vehicle continue to rotate is sufficiently long to tighten the seat belt webbing 34 against the occupant.

Associated with the retractors 32 are two elongate flexible members or cables 42. One end of each cable 42 extends into its associated retractor 32. The other end 44 of each cable 42 can be connected with the driven member 22 through a clutch mechanism 52. The cables 42 may be trained around pulleys located on the vehicle or may be disposed in respective housings connected to the vehicle. When the clutch mechanism 52 is actuated, the driven member 22 is connected with the cables 42 and applies a tension force in the direction of the arrow 54 (FIG. 2). The force applied to the cables 42 causes tightening of the seat belt webbing 34 against the occupant to force the occupant against the back of the seat 36. The clutch mechanism 52 is actuated in response to the vehicle decelerating at a rate above a predetermined rate. Such a predetermined rate might be, for example, a rate of deceleration of 8 gs (where 1 g is the acceleration force due to gravity) which is maintained for a minimum time duration of at least five miliseconds, such as would be encountered during a collision.

The retractors 32 (FIG. 2) are similar in construction. Each retractor 32 includes a spool 62 connected to a shaft 60. The shaft 60 supports the spool 62 for rotation in a belt retraction direction 64 and a belt withdrawal direction 66. Each retractor 32 also includes a frame 68 for mounting the retractor to the vehicle. A known fastener (not shown), such as a lug bolt, is inserted through an opening 72 in the frame 68 to connect the retractor 32 to the vehicle. The seat belt webbing 34 is connected to and wound onto the spool 62. The spool 62 is biased in the belt retraction direction 64 by a known return spring mechanism 78. The seat belt webbing 34 may be withdrawn from the stored or retracted position to extend about a vehicle occupant in one of the seats 36.

The retractor 32 has a ratchet wheel 82 (FIG. 3) connected to and rotatable with the spool 62. A plurality of teeth 84 extend from the outer periphery of the ratchet wheel 82. A pawl 86 is pivotally mounted to move into engagement with one of the teeth 84 on the ratchet wheel 82 to block rotation of the spool 62 in the belt withdrawal direction 66, as is known The pawl 86 may ratchet over the teeth 84 when the spool 62 rotates in the belt retraction direction 64. The pawl 86 is pivoted into engagement with a tooth 84 by a known inertia mechanism 92 supported by the frame 68. The inertia mechanism 92 has a member 94, such as a spherical mass, which moves in response to deceleration of the vehicle above a predetermined amount. The rate of deceleration of the vehicle at which the member 94 moves to pivot the pawl 86 is considerably less than the 8gs required to actuate the clutch mechanism 52 and may be, for example, about 0.70 g.

A drum 102 (FIG. 2) is mounted on each retractor 32 coaxial with the spool 62. The drum 102 is connected to and rotatable with the spool 62. A pin 100 (FIG. 3) is inserted through radial openings in the drum 102 and the shaft 60 to connect the drum to the shaft. The drum 102 has an exterior cylindrical surface with a diameter designated D1. A portion 104 of a cable 42 is loosely wound in a plurality of coils about the exterior cylindrical surface of the drum 102. A clearance C of about 1/16 of an inch between the portion 104 of the cable 42 and the drum 102 is preferred. The clearance C enables rotation of the spool 62 in the belt withdrawal direction 66 and the belt retraction direction 64 without affecting the cable 42 and without interference from the cable 42. A housing 114 (FIG. 2) is attached to the frame 68 and is located between the frame and the drum 102. Two lugs 118a, 118b project from the housing 114 in a direction parallel to the longitudinal axis of the shaft 60. The cable 42 extends past lug 118a, coils around the drum 102, and then extends past lug 118b. Clamps 112a, 112b are positioned adjacent lugs 118a, 118b, respectively, and clamp the cable 42 against the lugs. This maintains the clearance C between the portion 104 of the cable and the drum 102 until the cable is tensioned. The clamps 112 are biased toward the lugs 118 by relatively low rate springs 116. The clamping force exerted by the springs 116 is overcome when the cable 42 is tensioned by the engine driven member 22.

The clearance C between the portion 104 of the cable 42 and drum 102 is taken up when the cable is tensioned. Specifically, the portion of the cable 42 disposed between the clamp 112a and housing lug 118a is pulled downwardly, as indicated by the arrow 54 in FIG. 3. When the cable 42 moves downwardly an amount sufficient to take up the clearance C between the end portion 104 of the cable 42 and the drum 102, friction between the cable 42 and drum 102 causes the drum 102 to rotate in the belt retraction direction 64. The spool 62 is thus rotated in the belt retraction direction 64 to pull the seat belt webbing 34 in the direction indicated by the arrow 120 in FIG. 3 and against the occupant. The portion of the cable 42 clamped by the clamp 112b is pulled from between the clamp 112b and the housing lug 118b upon further rotation of the drum 102 to continue to tighten the seat belt webbing 34.

As previously described, the end of each cable 42 opposite its associated retractor 32 is connected to a clutch mechanism 52. In the preferred embodiment, the clutch mechanism 52 (FIG. 4) is attached to an end portion 122 of the housing of the transmission 124 (FIG. 1) of a rear wheel drive vehicle. It should be apparent that the clutch mechanism 52 may be attached to an engine crankshaft or a flywheel of a front wheel drive vehicle. The driven member 22, such as an output shaft of the transmission 124, extends from the portion 122 of the transmission housing. The driven member 22 is supported for rotation by the end portion 122 of transmission housing in a known manner. The clutch mechanism 52 has a housing 134 secured to the transmission housing. A bearing 132 is interposed between the housing 134 of the clutch mechanism 52 and the driven member 22.

A drum 142 (FIG. 5) is supported for rotation by a portion 144 of the housing 134. The end portion 162 of each cable 42 opposite the retractors 32 is connected to the drum 142 and winds on the drum 142 upon rotation of the drum 142. The drum 142 has an exterior cylindrical surface with a diameter designated D2 (FIG. 5) onto which the cables 42 wind. The diameter D2 of the drum 142 of the clutch mechanism 52 is preferably at least twice the diameter D1 of the drum 102 of the retractor 32. Thus, one revolution of the drum 142 of the clutch mechanism 52 will cause at least two revolutions of the drum 102 of the retractor 32. This assures that the belt webbing 34 is quickly tightened against the occupant after the clutch mechanism 52 is actuated.

Figure 6:
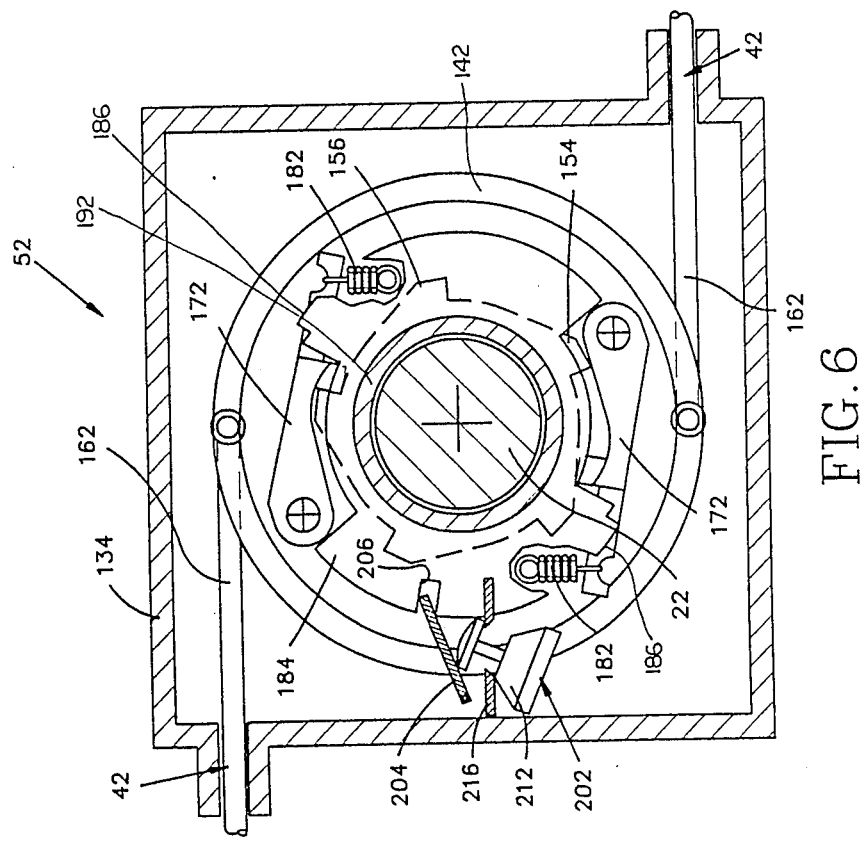

The drum 142 rotates with the driven member 22 when the clutch mechanism 52 is actuated, as is illustrated in FIG. 6. The clutch mechanism 52 includes a ratchet wheel 154 (FIG. 4) fixed to and rotatable with the driven member 22. The connection between the ratchet wheel 154 and the driven member 22 may be a key or adhesive bond. A plurality of radially projecting teeth 156 are spaced about the outer periphery of the ratchet wheel 154. The teeth 156 are engageable by pivotally movable clutch dogs 172 carried by the drum 142.

The clutch dogs 172 are biased by springs 182 toward engagement with the ratchet wheel 154. A plate 184, however, normally holds the clutch dogs 172 in a position away from the ratchet wheel 154 against the bias of the springs 182, as illustrated in FIG. 5. The plate 184 is supported for rotation by a portion 192 of the housing 134 of the clutch mechanism 52. The plate 184 has arcuate peripheral portions 186 that engage the clutch dogs 172 and hold the clutch dogs 172 away from the ratchet wheel 154 when the clutch mechanism 52 is not actuated.

The plate 184 is rotated relative to the portion 192 of the housing 134 by a lever 204 supported for pivotal movement by the housing 134. One end of the lever 204 projects into a radially extending notch 206 formed in the outer periphery of the plate 184. The central portion of the lever 204 rests on the enlarged head 214 of an inertia member 212. The disc-shaped head 214 is supported about its outer periphery by a support 216 carried by the housing 134. The major portion of the inertia member 212 hangs below the support 216 as a pendulum, and the inertia member can pivot about the support 216 in any direction. Pivotal movement of the inertia member 212 pivots the lever 204. Pivotal movement of the lever 204 causes the end of the lever in the notch 206 to rotate the plate 184 relative to the portion 192 of the housing 134, as illustrated in FIG. 6. Rotation of the plate 184 moves the arcuate portions 186 to a position in which they no longer maintain the clutch dogs 172 out of engagement with the ratchet wheel 154. This permits the biasing force of the springs 182 to move the clutch dogs 172 into engagement with the ratchet wheel 154.

In a preferred embodiment, there are five equally spaced teeth 156 and two diametrically opposite clutch dogs 172 in the clutch mechanism 52. Therefore, the ratchet wheel 154 will rotate a maximum of 1/10th of a revolution or 36° before a ratchet tooth 156 engages one of the clutch dogs 172 to connect the drum 142 of the clutch mechanism 52 to the driven member 22. The uppermost one of the clutch dogs 172 has moved into engagement with a tooth 156 of the ratchet wheel 154. This causes the drum 142 to rotate in the clockwise direction with the driven member 22 and to couple the cables 42 and the driven member 22.

The inertia mechanism 202, including the inertia member 212 and support 216, is designed to sense vehicle deceleration or acceleration above a predetermined rate. Upon sensing the predetermined rate of deceleration or acceleration of the vehicle, preferably at least 8Gs, the inertia member 212 will pivot the lever 204. The predetermined rate of deceleration is typically encountered during a collision, but it should be apparent that the clutch mechanism 52 may be actuated at other rates of deceleration.

During rotation of the drum 142, the cables 42 wind onto the drum, as illustrated in FIG. 7. A tension force is transmitted through the cables 42 to rotate the drum 102 of each of the retractors 32. Rotational movement of each drum 102 is transmitted to its associated spool 62 which rotates the spool 62 in the belt retraction direction 64 to tighten the belt webbing 34 against the occupant.

The pin 100 which connects the drum 102 to the shaft 60 is frangible. As the seat belt webbing 34 tightens about the occupant to restrain the occupant against the seat 36, the occupant's body resists further tightening of the belt webbing and, thus, rotation of the spool 62 in the belt retraction direction 64. This resistance to further tightening of the belt webbing 34 is transmitted through the belt webbing through the spool 62, to the shaft 60 and to the pin 100. If the force resisting tightening of the belt webbing 34 reaches a predetermined level and the drum 102 is still being rotated by the cable 42, the frangible pin 100 will break. The shaft 60 and spool 62 are then no longer driven by the cable 42 and no further tensioning force is applied to the belt webbing 34. The drum 102 may continue to rotate until the end portion 104 of the cable 42 is pulled off the drum. At this time, it should be apparent that the seat belt webbing 34 cannot be withdrawn from the retractor 32, because the emergency locking pawl 86 (FIG. 3) engages the ratchet wheel 82 during the emergency situation to block rotation of the spool 62 in the belt withdrawal direction 66.

A comfort mechanism (not shown) may be used on the retractor 32 to offset the bias of the return spring mechanism 78 of the retractor and block rotation of the drum 102 and spool 62 in the belt retraction direction 64. The force applied by the cable 42 to rotate the drum 102 and spool 62 in the belt retraction direction 64 is sufficient to deflect or break parts of the comfort mechanism in order to tighten the seat belt webbing 34 against the occupant.

From the above description of a preferred embodiment of the invention, those skilled in the art will perceive improvements, changes and modifications. Such improvements, changes and modifications within the skill of the art are intended to be covered by the appended claims.

Having described a specific preferred embodiment of the invention, I claim the following:

1. An apparatus for use in a vehicle having a member rotatably driven by a motive power source of the vehicle, said apparatus comprising:

a seat belt retractor having a spool supported for rotation in belt retraction and belt withdrawal direction; and clutch means for connecting the spool and the driven member so that rotation of the driven member rotates said spool in the belt retraction direction in response to the vehicle decelerating at a rate above a predetermined rate, said clutch means comprising:

a ratchet wheel having a plurality of ratchet teeth extending therefrom, said ratchet wheel being connected to and rotatable with the driven member;

a clutch dog supported for pivotal movement to a position engaging a tooth on said ratchet wheel to connect said spool with said driven member; and means for pivoting said clutch dog into the position engaging said tooth on said ratchet wheel in response to the vehicle decelerating at a rate above the predetermined rate.

2. The apparatus set forth in claim 1 wherein said clutch means further includes a first drum connected to and rotatable with said spool, a second drum connected with said clutch means for rotation upon actuation of said clutch means, and an elongate flexible member having a first end portion wound about said first drum and connected at a second end portion to said second drum for rotating said first drum in the belt retraction direction during rotation of said second drum.

3. The apparatus set forth in claim 2 wherein said first drum has an outer surface of a first diameter and said elongate flexible member is wound around said outer surface in at least one coil defining an inner circumference of a second diameter larger than said first diameter.

4. The apparatus set forth in claim 2 wherein said ratchet teeth extend radially from the driven member and said clutch dog is carried by said second drum and pivots in a plane extending transverse to the longitudinal central axis of said second drum.

5. The apparatus set forth in claim 2 further including means for releasing the driving connection between said spool and the driven member in response to a predetermined force resisting rotation of said spool in the belt retraction direction.

6. The apparatus set forth in claim 5 wherein said means for releasing the driving connection includes a frangible pin that connects said spool with said first drum, said pin breaking in response to the predetermined force resisting rotation of said spool in the belt retraction direction.

7. The apparatus set forth in claim 1 wherein said means for pivoting said clutch dog includes an inertia sensor for sensing the rate of deceleration of the vehicle, a lever supported for pivotal movement and which pivots in response to said inertia sensor sensing deceleration of the vehicle above the predetermined rate, and a plate supported for rotational movement blocking the clutch dog from engaging said tooth on said ratchet wheel, said plate rotating in response to pivoting of said lever to allow said clutch dog to engage said tooth on said ratchet wheel.

8. An apparatus for use with a vehicle seat belt retractor having a spool with belt webbing wound thereon, and which spool is supported for rotation in belt retraction and withdrawal directions, said apparatus comprising:
a first drum connectable with the spool for rotation with the spool;
an elongate flexible member having a first end portion wound about said first drum to rotate said first drum and the spool in the belt retraction direction in response to tensioning of said elongate flexible member; and
clutch means for connecting a second end portion of said elongate flexible member with a rotatable member of the vehicle for tensioning said elongate flexible member in response to deceleration of the vehicle at a rate above a predetermined rate, said clutch means comprising:
a ratchet wheel having a plurality of teeth extending therefrom, said ratchet wheel being connected to and rotatable with the rotatable member;
a second rotatable drum connected to said second end portion of said elongate flexible member for winding said elongate flexible member thereon during rotation of said second drum to tension said elongate flexible member;
a clutch dog carried by said second drum for pivotal movement to a position engaging a tooth on said ratchet wheel to connect said second drum with said rotatable member for rotation with the rotatable member; and
means for pivoting said clutch dog into said position engaging a tooth on said ratchet wheel in response to the vehicle decelerating at a rate above the predetermined rate.

9. The apparatus set forth in claim 8 wherein said means for pivoting said clutch dog includes an inertia sensor for sensing the rate of deceleration of the vehicle, a lever supported for pivotal movement and which pivots in response to said inertia sensor sensing deceleration of the vehicle above the predetermined rate, and a plate supported for rotational movement blocking the clutch dog from engaging said tooth on said ratchet wheel, said plate rotating in response to pivoting of said lever to allow said clutch dog to engage said tooth on said ratchet wheel.

10. The apparatus set forth in claim 9 wherein said first drum has a cylindrical outer surface of a first diameter and said second drum has a cylindrical outer surface of a second diameter at least twice the first diameter.

11. The apparatus set forth in claim 8 wherein said ratchet teeth extend radially from the rotatable member and said clutch dog pivots in a plane extending transverse to the longitudinal central axis of said second drum.

12. The apparatus set forth in claim 8 further including means for releasing the connection between said second end portion of said elongated flexible member and the rotatable member in response to a predetermined force resisting rotation of said drum.

13. The apparatus set forth in claim 12 wherein said means for releasing the driving connection includes a frangible pin that connects the spool with said first drum, said pin breaking in response to the predetermined force resisting rotation of the spool.

* * * * *